United States Patent
Tariq et al.

(10) Patent No.: US 9,353,016 B2
(45) Date of Patent: *May 31, 2016

(54) PROCESS OF PRODUCING BIO-ORGANO-PHOSPHATE (BOP) FERTILIZER THROUGH CONTINUOUS SOLUBILIZATION OF ROCK PHOSPHATE BY COMPOSTING BIOPROCESS AND BIOAUGMENTATION WITH PHOSPHORUS SOLUBILIZING MICROORGANISMS

(71) Applicant: NIHA CORP., Ontario, CA (US)

(72) Inventors: Nadeem Tariq, Lahore (PK);
Muhammed Arshad, Multan (PK);
Hamad Raza Jamshed, Multan (PK);
Nasim Ahmed, Rancho Cucamonga, CA (US)

(73) Assignee: NIHA CORPORATION, Ontario, CA (US)

( * ) Notice: Subject to any disclaimer, the term of this patent is extended or adjusted under 35 U.S.C. 154(b) by 35 days.

This patent is subject to a terminal disclaimer.

(21) Appl. No.: 14/561,039

(22) Filed: Dec. 4, 2014

(65) Prior Publication Data

US 2015/0158777 A1   Jun. 11, 2015

Related U.S. Application Data

(63) Continuation of application No. 13/789,407, filed on Mar. 7, 2013, now Pat. No. 8,932,382.

(60) Provisional application No. 61/651,196, filed on May 24, 2012.

(51) Int. Cl.
| C05B 15/00 | (2006.01) |
| C05D 9/00 | (2006.01) |
| C05F 9/04 | (2006.01) |

(52) U.S. Cl.
CPC . *C05B 15/00* (2013.01); *C05D 9/00* (2013.01); *C05F 9/04* (2013.01); *Y02P 20/145* (2015.11)

(58) Field of Classification Search
CPC .............. C05B 15/00; C05D 9/00; C05F 9/04
USPC ....................................................... 71/6–10
See application file for complete search history.

(56) References Cited

U.S. PATENT DOCUMENTS

| 3,186,826 A | 6/1965 | Del Muro de Rendon |
| 4,589,225 A | 5/1986 | Stensaas |
| 5,147,441 A | 9/1992 | Megeed |

(Continued)

FOREIGN PATENT DOCUMENTS

| WO | 2004/035508 | * 4/2004 |
| WO | WO 2010/018210 | 2/2010 |
| WO | WO 2012/038740 | 3/2012 |

OTHER PUBLICATIONS

WO, PCT/US2013/033005 ISR, Jul. 15, 2013.
WO, PCT/US2013/033005 IPRP, Nov. 25, 2014.
Ahmad, R., et al., "Growth and Yield Response of Wheat (*Triticum aestivum* L.) and Maize (*Zea mays* L.) to Nitrogen and L-Tryptophan Enriched Compost", Pak. J. Bot., 2007, vol. 39, No. 2, pp. 541-549.
Ahmad, R., et al., "Bio-conversion of organic wastes for their recycling in agriculture: An overview of perspectives and prospects", Annals of Microbiology, 2007, vol. 57, No. 4, pp. 1-10.

(Continued)

*Primary Examiner* — Wayne Langel
(74) *Attorney, Agent, or Firm* — One LLP

(57) ABSTRACT

A bio-organo-phosphate fertilizer having a consortia of microorganisms including phosphorus solubilizing microorganisms and rock phosphate enriched compost is described. The bio-organo-phosphate fertilizer can also include plant growth regulating microorganisms.

10 Claims, 5 Drawing Sheets

(56) References Cited

U.S. PATENT DOCUMENTS

| | | | |
|---|---|---|---|
| 5,578,486 | A | 11/1996 | Zhang |
| 5,912,398 | A | 6/1999 | Goldstein et al. |
| 8,066,793 | B2 | 11/2011 | Sinclair |
| 8,530,220 | B2 | 9/2013 | Ho et al. |
| 2005/0039509 | A1 | 2/2005 | Muma |
| 2008/0216534 | A1 | 9/2008 | Karr |
| 2008/0257000 | A1 | 10/2008 | McMahon et al. |
| 2010/0234222 | A1 | 9/2010 | Gidekel et al. |
| 2011/0100078 | A1 | 5/2011 | Ho et al. |

OTHER PUBLICATIONS

Ahmad, R., et al., "Effectiveness of Organic-/Bio-Fertilizer Supplemented with Chemical Fertilizers for Improving Soil Water Retention, Aggregate Stability, Growth and Nutrient Uptake of Maize (*Zea mays* L.)", Journal of Sustainable Agriculture, 2008, vol. 31, No. 4, pp. 57-77.

Aziz, T., et al., "Phosphorus Utilization by Six Brassica Cultivars (*Brassica juncea* L.) From Tri-Calcium Phosphate; a Relatively Insoluble P Compound", Pak. J. Bot., 2006, vol. 38, No. 5, pp. 1529-1538.

Bhattacharyya, P., et al,. "Municipal waste compost as an alternative to cattle manure for supplying potassium to lowland rice", Chemosphere, 2007, vol. 66, pp. 1789-1793.

Bojinova, D., et al., "Solubilization of Morocco phosphorite by *Aspergillus niger*", Bioresource Technology, 2008, vol. 99, pp. 7348-7353.

Caravaca, F., et al., "Comparing the effectiveness of mycorrhizal inoculation and amendment with sugar beet, rock phosphate and *Aspergillus niger* to enhance field performance of the leguminous shrub *Dorycnium pentaphyllum* L.", Applied Soil Ecology, 2004, vol. 25, pp. 169-180.

Dastager, S. G., et al., "Isolation and characterization of novel plant growth promoting *Micrococcus* sp NII-0909 and its interaction with cowpea", Plant Physiol. Biochem., 2010, vol. 48, No. 12, pp. 987-992.

Dworkin, M., et al., "Experiments With Some Microorganisms Which Utilize Ethane and Hydrogen", Utilization of Ethane and Hydrogen, 1958, vol. 75, pp. 592-603.

Gupta, A., et al., "Role of Biofertilizers and Biopesticides for Sustainable Agriculture", 2012, Department of Biotechnology, Singhania University, Rajasthan.

Gyaneshwar, P., et al., "Effect of buffering on the phosphate-solubilizing ability of microorganisms", World Journal of Microbiology & Biotechnology, 1998, vol. 14, pp. 669-673.

Hamza, M. A., et al., "Potential and limitations of soil organic matter build-up in dry areas", African Journal of Agricultural Research, 2010, vol. 5, No. 20, pp. 2850-2861.

Harris, J. N., et al., "Laboratory tests can predict beneficial effects of phosphate-solubilising bacteria on plants", Soil Biology & Biochemistry, 2006, vol. 38, pp. 1521-1526.

Isherwood, K.F., "Mineral Fertilizer Use and the Environment", International Fertilizer Industry Association, 2000, Paris, pp. 1-52.

Kennedy, A.C., et al., "Soil microbial diversity and the sustainability of agricuktural soils", Plant and Soil, 1995, vol. 170, pp. 75-86.

Khan, M. S., et al., "Synergistic Effects of the Inoculation with Plant Growth-Promoting Rhizobacteria and an Arbuscular Mycorrhizal Fungus on the Performance of Wheat", Turk. J. Agric. For., 2007, vol. 31, pp. 355-362.

Khan, A. A., et al., "Phosphorus Solubilizing Bacteria: Occurrence, Mechanisms and their Role in Crop Production", J. Agric. Biol. Sci., 2009, vol. 1, No. 1, pp. 48-58.

López-Bucio, J., et al., "The role of nutrient availability in regulating root architecture", Current Opinion in Plant Biology, 2003, vol. 6, pp. 280-287.

Mahdi, S. S., et al., "Bio-Fertilizers in Organic Agriculture", Journal of Phytology, 2010, vol. 2, No. 10, pp. 42-54.

Malboobi, M.A., et al., "Solubilization of organic and inorganic phosphates by three highly efficient soil bacterial isolates", World J. Microbiol. Biotechnol., 2009, vol. 25, No. 8, pp. 1471-1477.

Manzar-Ul-Alam, S., et al., "Evaluation of method and time of fertilizer application for yield and optimum P-efficiency in wheat", Songklanakarin J. Sci. Technol., 2005, vol. 27, No. 3, pp. 457-463.

Mullins, G., "Phosphorus, Agriculture & The Environment", Virginia Polytechnic Institute and State University, 2009, Publication 424-029, pp. 1-16.

Nautiyal, C. S., "An efficient microbiological growth medium for screening phosphate solubilizing microorganisms", FEMS Microbiology Letters, 1999, vol. 170, pp. 265-270.

Penrose, D. M., et al., "Methods for isolating and characterizing ACC deaminase-containing plant growth-promoting rhizobacteria", Physiologia Plantarum, 2003, vol. 118, pp. 10-15.

Rodríguez, H., et al., "Phosphate solubilizing bacteria and their role in plant growth promotion", Biotechnology Advances, 1999, vol. 17, pp. 319-339.

Ryan, J., et al., "Soil and Plant Analysis Laboratory Manual, Second Edition, Table of Contents", 2001, ICARDA, pp. 1-5.

Schachtman, D. P., et al., "Phosphorus Uptake by Plants: From Soil to Cell", Plant Physiol., 1998, vol. 116, pp. 447-453.

Semêdo, L.T.A.S., et al., "Isolation and characterization of actinomycetes from Brazilian tropical soils", Microbiol. Res., 2001, vol. 155, pp. 291-299.

Shaharoona, B., et al., "Fertilizer-dependent efficiency of Pseudomonads for improving growth, yield, and nutrient use efficiency of wheat (*Triticum aestivum* L.)", Appl. Microbiol. Biotechnol., 2008, vol. 79, pp. 147-155.

Shahzad, S.M., et al., "Screening rhizobacteria containing ACC-deaminase for growth promotion of chickpea seedlings under axenic conditions", Soil & Environ., 2010, vol. 29, No. 1, pp. 38-46.

Sekhar, D.M.R., et al., "Phosphate rock with farmyard manure as P fertilizer in neutral and weakly alkaline soils", Current Science, 2001, vol. 80, No. 9, pp. 1113-1115.

Shenoy, V.V., et al., "Enhancing plant phosphorus use efficiency for sustainable cropping", Biotechnology Advances, 2005, vol. 23, pp. 501-513.

Takahashi, S., et al., "Wheat grain yield, phosphorus uptake and soil phosphorus fraction after 23 years of annual fertilizer application to an Andosol", Field Crops Research, 2007, vol. 101, pp. 160-171.

Vance, C. P., et al., "Symbiotic Nitrogen Fixation and Phosphorus Acquisition. Plant Nutrition in a World of Declining Renewable Resources", Plant Physiology, 2001, vol. 127, pp. 390-397.

Vance, C. P., et al., "Phosphorus acquisition and use: critical adaptations by plants for securing a nonrenewable resource", New Phytologist, 2003, vol. 157, pp. 423-447.

Van Straaten, P., "Rocks for Crops: Agrominerals of sub-Saharan Africa", 2002, ICRAF, Nairobi, Kenya, pp. 1-348.

Vassilev, N., et al., "Biotechnological solubilization of rock phosphate on media containing agro-industrial wastes", Appl. Microbiol. Biotechnol., 2003, vol. 61, pp. 435-440.

Walpola, B. C., et al., "Prospectus of phosphate solubilizing microorganisms and phosphorus availability in agricultural soils: A review", African Journal of Microbiology Research, 2012, vol. 6, No. 37, pp. 6600-6605.

Williamson, L.C., et al., "Phosphate Availability Regulates Root System Architecture in Arabidopsis", Plant Physiology, 2001, vol. 126, pp. 875-882.

"Environmental, Health and Safety Guidelines for Phosphate Fertilizer Manufacturing", International Finance Corporation, World Bank Group Report, 2007, pp. 1-20.

Zou, X., et al., "A new method for estimating gross phosphorus mineralization and immobilization rates in soils", Plant and Soil, 1992, vol. 147, pp. 243-250.

Zuberer, D. A., et al., "Recovery and Enumeration of Viable Bacteria", Methods of Soil Analysis, Part 2. Microbiological and Biochemical Properties—SSSA Book Series, No. 5, Chapter 8, 1994, pp. 119-144.

\* cited by examiner

Media 1 for F1 breeding for 100 mL [of PSM and PGRM]

160

Ingredients

| | | | |
|---|---|---|---|
| Mannitol | 3-4 g | KH₂PO₄ | 0.1-0.13 g |
| Yeast Extract | 0.3-0.7 g | MgSO₄ | 0.1 – 0.13 g |
| Distilled water | 100 ml | | |

Preparation Techniques

Prepare the same medium in two separate containers for PSM and PGRM. Maintain pH between 6.0 – 7.5. Adjust pH by adding 1M solution of either $H_2SO_4$ or NaOH. Autoclave the mixture in both containers as per standard procedure then allowing the mixtures to cool to mesophillic range maintaining pH close to neutral level. Mix selected strains of PSM and PGRM in respective containers under aseptic conditions. Shaking should be done by continues shaking on an orbital shaker. Desired population should be achieved in 50 to 96 hours.

FIGURE 3

| Media for commercial production [of PSM and PGRM] 170 |||||
|---|---|---|---|---|
| Ingredients | | | | |
| Trypton | 15-20 g | | Calcium Pantothinate | 0.1-0.15 g |
| Yeast extract | 4-7 g | | Vitamin B1 | 0.3-0.7 mL |
| KH$_2$PO$_4$ | 0.15-0.2 g | | Vitamin B12 | 0.3-0.7 mL |
| MgSO$_4$ | 0.3-0.7 g | | Distil water | 1 Liter |
| Preparation Techniques |||||
| Prepare same medium in two separate containers for PSM and PGRM. Maintain pH between 6.0 – 7.5. Adjust pH by adding 1M solution of either H2SO4 or NaOH. Autoclave the mixture in both containers as per standard procedure then allowing the mixtures to cool to mesophillic range maintaining pH close to neutral level. Mix selected strains of PSM and PGRM in respective containers under aseptic conditions. Shaking should be done by continues aeration. Desired population is achieved in 50-96 hours. |||||

FIGURE 4

PROCESS OF PRODUCING BIO-ORGANO-PHOSPHATE (BOP) FERTILIZER THROUGH CONTINUOUS SOLUBILIZATION OF ROCK PHOSPHATE BY COMPOSTING BIOPROCESS AND BIOAUGMENTATION WITH PHOSPHORUS SOLUBILIZING MICROORGANISMS

CROSS REFERENCES TO RELATED APPLICATIONS

This application is a continuation of U.S. patent application Ser. No. 13/789,407, filed Mar. 7, 2013, now U.S. Pat. No. 8,932,382, which claims the benefit of U.S. Provisional Patent Application No. 61/651,196, filed May 24, 2012, which applications are hereby incorporated by reference in their entirety.

TECHNICAL FIELD

This invention relates generally to the field of production of bio-organo-phosphate (BOP) fertilizer. More particularly, this invention relates to the field of isolation, screening and optimization of consortia of efficient phosphate solubilizing microorganisms (PSM) and novel plant growth regulating microorganisms (PGRM), wherein the PSM produce organic acids and other organic compounds within a compost substrate, which thereafter may be bioaugmented with PGRM to facilitate phosphorus (P) bioavailability to plants for better growth.

BACKGROUND

I. The Problem with Sub-Optimal Use of Phosphatic Fertilizers.

Phosphorus (P) is an important nutrient required for plant growth and development, making up 0.2% of plants on dry weight basis. (Vance, 2001; Sachachtman et al., 1998.) It is a significant part of a plant's physiological and biochemical activities, such as photosynthesis, carbon metabolism, membrane formation, energy generation, nucleic acid synthesis, glycolysis, respiration, enzyme activation/inactivation and nitrogen fixation. (Bucio et al., 2003.)

Plants absorb most of their phosphorus as the primary orthophosphate ion ($H_2PO_4^-$) and a smaller amount from the secondary orthophosphate ion ($HPO_4^{--}$). Plants also absorb certain soluble organic phosphates (i.e. $PO_4^{--}$, nucleic acid and phytic acid). (Sekhar and Aery, 2001; Mullins, 2009.)

Amongst a number of advantages, the addition of phosphorus creates deeper and more abundant plant roots. (Gupta and Sen, 2012.) Conversely, a phosphorus deficiency alters root architecture, which ultimately affects seed development and normal crop maturity. (Williamson et al., 2001.) Thus, the availability of adequate phosphorus is fundamental to stimulate early plant growth and hasten maturity.

However, phosphorus is among the least bio-available nutrients in soil (Takahashi and Anwar, 2007.) While the total amount of phosphorus is 0.05% of soil content on average, only 0.1% of that amount is available to plants. (Zou et al., 1992.) Even in fertile soils, less than 10 µM is available at pH 6.5 where it is the most soluble. (Gyaneshwar et al., 1998.)

Soil phosphorus is found in both organic and mineral pools. Twenty percent (20%) to eighty percent (80%) of soil phosphorus is found in an organic form, such as phytic acid, while the rest of phosphorus is found as inorganic fraction. (Sachachtman et al., 1998.) Because most arid and semi-arid soil regimes are deficient in phosphorus, phosphatic fertilizers are required to replenish the phosphorus demanded by crop plants.

However, more than 80% of the phosphorus applied as fertilizer stagnates in an immobile pool due to the presence of iron (Fe) and aluminum (Al) in acidic soils, and calcium (Ca) in neutral and alkaline soils, resulting in insolubilization, precipitation and adsorption or conversion into an organic form through biological activities. (Harris et al., 2006.) This so called "fixation" of externally supplied phosphorus is common in arid alkaline and calcareous soils because of the higher activity of the calcium. And when coupled with a high pH typically found in soils, the application of externally supplied phosphorus favors the precipitation of relatively insoluble di-calcium phosphate and other basic calcium phosphates such as hydroxyl-apatite and carbonato-apatite decreasing the activity of phosphorus. Research suggests that phosphorus "fixation" in alkaline soils is largely attributed to the retention by clays saturated with calcium. Because calcium ions can retain greater amount of phosphorus as those saturated with sodium or other mono-violent ions, the formation of clay ($Ca^{++}$—$H_2PO_4^{--}$) is believed to be the most likely culprit.

Low availability of phosphorus to crop plants is a worldwide problem and thus crop yield on 30 to 40% of world's arable land is limited by phosphorus availability. (Vance et al., 2003.)

To overcome the consistent deficiency of phosphorus in alkaline/calcareous soils, soluble phosphatic fertilizers are applied to agricultural fields to maximize crop production. (Shenoy and Kalagudi, 2005.) Commercial fertilizers have played a very significant role in enhancing the per acre yield of crops and in return feeding the rising population of the world.

Unfortunately, however, current production of phosphorus fertilizers is insufficient to meet rising demand. The alarming depletion of world resources of rock phosphate, along with their low use efficiency, has resulted in consistently increasing prices of phosphorus fertilizers. Elevated fertilizer prices, their scarcity at the right time of application, as well as suboptimal doses largely accounts for low phosphorus fertilizers use. (Alam et al., 2005.) In addition to these problems, the fixation/precipitation/adsorption/transformation of phosphorus decreases efficiency of applied chemical phosphorus fertilizers. Such sub-optimal use of phosphate fertilizers has led to exogenous application of substantial quantities of phosphatic fertilizers in agricultural fields. (Vassilev and Vassileva, 2003; Aziz et al., 2006.)

Accordingly, improved supply of organic phosphate which not only supply soluble organic phosphates but also release substantial amount of phosphorus through microbial mineralization of organically bound phosphorus would be highly desirable.

II. Current Limitations with Production of Fertilizers and Inefficient Use.

Rock phosphate (RP) is a basic raw material used for manufacturing of chemical phosphatic fertilizer. Globally, there are four major types of phosphate resources in the world, including marine, igneous, metamorphic and biogenic phosphate deposits which contain either of the fluor-apatite ($Ca_{10}(PO_4)_6F_2$), hydroxy-apatite ($Ca_{10}(PO_4)_6(OH)_2$), carbonate-hydroxy-apatite ($Ca_{10}(PO_4CO_3)_6(OH)_2$), francolite, dahllite, and cellophane compounds. (Straaten, 2002.) Reserves are primarily found in Northern Africa, China, the Middle East, United States, Brazil, Canada, Finland, Russia and South Africa. Large phosphate resources have also been identified on the continental shelves and on seamounts in the Atlantic and the Pacific Ocean. World rock phosphate reserves are more than 300 billion tons, while annual consumption in 2011 was 191 million terns, up 20% from 2010.

The desired grade of rock phosphate for manufacturing classic chemical fertilizers is one having 30% $P_2O_5$ or higher, with low silica, magnesium and other elements. Reserves of these grades are declining. A number of physio-chemical processes are employed to improve $P_2O_5$ content of low-grade rock phosphate and to remove undesired elements. Physical and thermal up gradation of rock phosphate is achieved through crushing & screening, scrubbing, de-sliming, flotation and magnetic and gravitation separation. However, a substantial amount of energy is consumed and environmental pollutants are released in these processes.

Rock phosphate shows a considerable proportion of isomorphic substitution in the crystal lattice and has a variable proportion and amounts of accessory minerals and impurities. Research shows that rock phosphates are appropriate for direct use in acidic soils for the supply of available phosphorus, but are unsuitable for neutral to alkaline soils. (Sekhar and Aery, 200 L) Thus, the release of bioavailable phosphorus from insoluble phosphates in alkaline/calcareous soil is important for sustainable agriculture by mobilizing its phosphorus through a variety of advanced approaches where an inert phosphorus source is predictable, and can be rehabilitated into plant available form. (Kennedy and Smith, 1995; Caravaca et al., 2004.)

In addition to phosphorus problems, depleted organic matter reserves of arid alkaline/calcareous soils further decrease crop production, as well as affect numerous soil metabolic processes. (Mullins, 2009.) Most organic matter decomposes quickly when applied in hot arid climate, which explains why arid soils are poor in organic matter. But, organic matter is a universal remedy and is known to improve soil health and availability of nutrients to plant. Most organic wastes are a potential source of plant macronutrients as well as providing a large quantity of micronutrients. However, it is difficult to increase the organic matter content of soils that are well aerated, such as in coarse sands and soils in warm-hot and arid regions, because added materials decompose rapidly. (Hamza and Anderson, 2010.)

Generally, arid climate tends to enhance microbial decomposition of organic matter, and such soils are low in organic carbon. When any inoculum or microorganism cells are added to those soils, their population typically do not reach a level at which they can perform efficiently. In many cases, they do not survive long, often resulting in inconsistent performance. This situation alarmingly needs restoration of organic matter through exogenous application. But unlike chemical fertilizers, these organic amendments are not that rich in nutrients, particularly in phosphorus. Therefore, after the introduction of chemical fertilizers and high yielding varieties in cropping system, farmers are largely dependent on continuous injection of chemical fertilizers to meet high plant nutrient requirements.

But, the use of organic waste and chemical fertilizers not only requires constant replenishment (with significant resources to create), but they are also a source of pollution, requiring additional management for short term and long term environmental impacts. Organic waste management is a major environmental issue because constant population growth means commensurately more waste to be recycled. Likewise, chemical fertilizer manufacturing is known to generate a wide range of air emissions, hazardous materials, effluents, waste water, and other harmful byproducts are generated (e.g. hydrofluoric acid, silicon, tetrafluoride, fluoride, $SO_4$phospho-gypsum, $NH_4$, $NO_x$ fluoride air, $P_2O_5$ effluents, dust fluoride effluents, chloride, cadmium, lead, radionuclides and sulfur compounds, etc.). Further, chemical fertilizer manufacturing also consumes substantial energy, ranging from 120 to 450 KWh per ton of $P_2O_5$, depending on the process employed. Moreover, chemical fertilizer manufacturing consumes substantial amounts of water, ranging from 2 to 150 cubic meters per ton of $P_2O_5$, depending on the process employed. (UNEP Technical report, 1996; World Bank Group report, 2007.)

As the worldwide population grows, and the need for agricultural farming using organic waste and chemical fertilizers increase, recycling organic wastes is quickly becoming a major environmental issue. Composting organic residues is believed to be the best possible means to recycle. Using composted products improves soil properties, and in turn improves soil productivity, thus promoting the plant growth. (Vassilev and Vassileva, 2003.)

Thus, the efficient use of organic fertilizers is a key strategy not only for improving soil organic matter content and nutrients supply but also for reducing the input cost of mineral fertilizers and promoting healthier environment. (Bhattacharyya et al., 2007; Ahmad et al., 2007a.)

Organic approaches that partially supplement nutrients through organic sources (and which do not involve synthetic formulation) have gained considerable positive response during recent years. However, under the current hegemony of organic fertilizer practitioners, and because of accelerated decomposition, the use of organic materials remain poor in nutrient contents and do not completely fulfill nutritional needs of crops, particularly of phosphorus, for normal growth and yields. (Ahmad et al., 2007b.)

However, lab research suggests that organic fertilizers can be used as rich carriers of plant growth promoting rhizobacteria that not only mobilize nutrients in soils but also facilitate nutrient uptake of less mobile nutrients, such as phosphorus, by altering root architecture. These synergistic effects benefit crops tremendously. (Shahroona et al., 2008.) And novel plant growth promoting rihizobacteria (PGPR) isolates show promising attributes when developed and used as bio-fertilizers to enhance soil fertility and promote plant growth. (Dastgeer, 2010.)

However, a consistently lacking element in the use of PGPR isolates is the ability to consistently deliver the "right type" of bacteria that plays the appropriate role in phosphorus nutrition. Unless one consistently delivers the "right type" of bacteria that solubilize/mineralize inorganic and organic soils, such delivery cannot enhance phosphorus availability to plants. (Ahmad et al., 2009; Walpola and Yoon, 2012.)

Based in part on the hegemony of current organic fertilizer users, and based on sparse research available on cultivating PGPR isolates, let alone those that are augmented with phosphate solubilizing microorganisms (PSM) or plant growth regulating microorganisms (PGRM) including, but not restricted to, prokaryotes such as algae, bacteria, protozoa etc., and eukaryotes such as fungi, etc.; there exists a void in the industry as to the large scale production of bio-organo-phosphate (BOP) fertilizer using these technologies to produce wide range of organic P grades suiting crop, soil and environmental conditions.

Accordingly, improved efficacy due to less probability of fixation, precipitation or insolubilization than current commercial soluble chemical/inorganic fertilizers is desired. In addition, the environmentally conscious production, application, and management of organic fertilizers are likewise desirable. In sum, there exists a long-felt industry need for the large-scale production of bio-organo-phosphate (BOP) fertilizer of a wide range of organic P grades that consistently and optimally delivers phosphorus to plants to help improve root architecture, enhance nutrient uptake, accelerate healthy growth and hasten maturity.

SUMMARY OF THE INVENTION

To improve upon existing methods and processes, the preferred embodiments of the present invention make the phosphorus of rock phosphate mobilized into plant available forms, while providing a several improvements over the existing art:

First, the preferred embodiment of the present invention allows one to formulate an excellent phosphorus-enriched product for organic agriculture with no synthetic process involved.

Second, being an organic phosphate, the phosphorus present in product developed through the preferred embodiment of the present invention will not readily enter into immobile pool of soil. The organically bound phosphorus is released slowly and gradually upon mineralization and steadily taken up by plant. Thus, the preferred embodiment of the present invention will ensure stable and consistent supply of phosphorus for plant uptake. In other words, the preferred embodiment of the present invention will give substantial supply of organic phosphate which can not only supply soluble organic phosphates but also release substantial amount of phosphorus through microbial mineralization of organically bound phosphorus.

Third, the preferred embodiment of the present invention will introduce/promote integrated nutrient management through regular supply of nutrients from decomposing organic matter enriched with rock phosphate and augmented with PSM and PGRM. This will improve soil health and plant roots architecture in addition to nutrient supplements versus classical chemical fertilizer supplying nutrients only.

Fourth, the preferred embodiment of the present invention will use all types of rock phosphate available across the globe to produce high quality organic phosphate. Current chemical production processes cannot utilize rock phosphate rich in impurities (such as ferrous, silica, magnesium, etc.), without first undergoing a beneficiation process, which in turn results in significantly higher production cost and release of pollutants to the environment. Thus, one of the benefits of the preferred embodiment of the present invention is to use more efficiently and effectively all grades of rock phosphate with significant reduction in energy consumption, water use, and largely eliminate release of environmental pollutants.

Fifth, the continuous use of the product produced by the preferred embodiment, will develop soil environment conducive for mobilizing other nutrients for better uptake by plants leading to enhanced soil productivity.

Finally, organic phosphate produced by the preferred embodiment of the present invention has better use efficacy due to less probability of fixation, precipitation or insolubilization of added P; and its better utilization by plants due to improved root architecture than that observed in case of current commercial soluble chemical/inorganic fertilizers. This will help to reduce ever increasing per hectare use of phosphatic fertilizers.

One preferred method and process to produce bio-organophosphate (BOP) fertilizer includes isolation and selection of microorganisms 100 (including PSM and novel PGRM), engaging in biocomposting and bioaugmentation with PSM and PGRM 200, and finally production of bio-organo-phosphate (BOP) fertilizer 300. As described below, the preferred method of isolation and selection of efficient PSM and novel PGRM 110 can further include optimizing phosphate solubilization by PSM based on a qualitative analysis 120 and/or quantitative analysis 130. Alternately, or in addition to the aforementioned step, the preferred method of isolation and selection of efficient PSM and novel PGRM 110 can further include 1-amino-cyclopropane-1-carboxylic acid (ACC) deaminase activity (ACCDA) by PGRM based on qualitative analysis 125 and α-ketobutyrate production by PGRM based on a quantitative analysis 135. Moreover, and as described below, the preferred method of commercial production of separate inocula containing PSM and PGRM 150 can further include identifying the specific ingredients and processes for F1 breeding 160, identifying the specific ingredients and processes for commercial production 170. Further, and as described below, the preferred method can also include controlling for various factors in the biocomposting and bioaugmentation processes 200. Other variations, features, and aspects of the system and method of the preferred embodiment are described in detail below with reference to the appended drawings.

Other methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

In order to better appreciate how the above-recited and other advantages and objects of the inventions are obtained, a more particular description of the embodiments briefly described above will be rendered by reference to specific embodiments thereof, which are illustrated in the accompanying drawings. It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes and other detailed attributes may be illustrated schematically rather than literally or precisely.

FIG. 3 depicts a chart identifying the proper ratios and method for media 1 for 100 mL F1 breeding of PSM and PGRM.

FIG. 4 depicts a chart identifying the proper ratios and method for production of media for commercial production of PSM and PGRM.

DETAILED DESCRIPTION OF THE PREFERRED EMBODIMENTS

The following description of the preferred embodiments of the invention is not intended to limit the invention to these preferred embodiments, but rather to enable any person skilled in the art to make and use this invention. Although any methods, materials, and devices similar or equivalent to those described herein can be used in the practice or testing of embodiments, the preferred methods, materials, and devices are now described.

The preferred embodiment of the present invention relates to improved methods and processes to produce BOP fertilizer through continuous solubilization of rock phosphate by a composting bioprocess and bioaugmentation with phosphorus solubilizing microorganisms.

It must be noted that the present invention will function either by using PSM (alone), or by using the combination of PSM and PGRM, as described infra. However, the preferred method and process of the present invention comprises the use of both PSM and PGRM, which is further described below. Notwithstanding, the same invention may be practiced by following the steps below, and omitting the steps involving PGRM.

Figure 1:
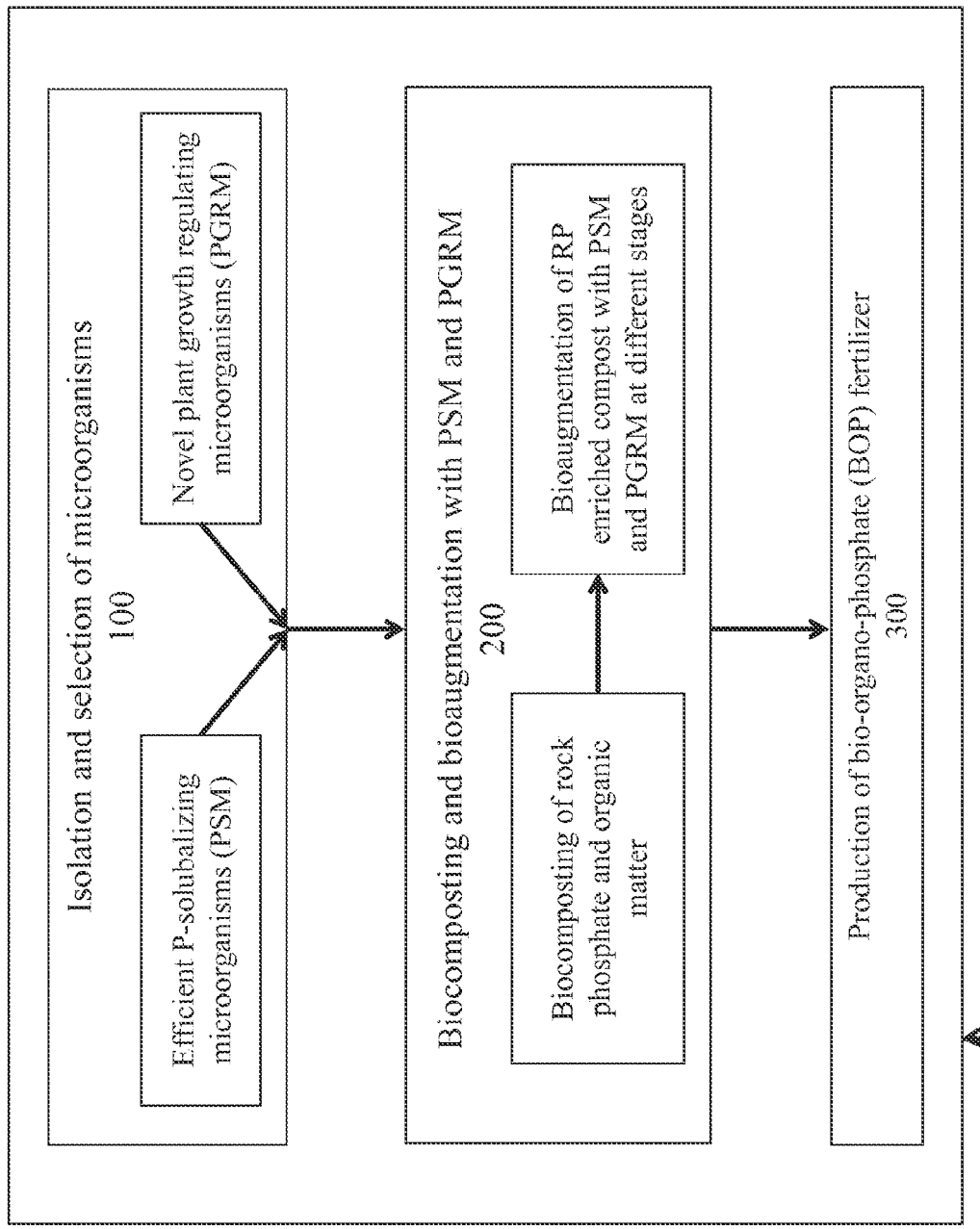
FIG. 1 is a diagram of a method and process to produce BOP fertilizer through continuous solubilization of rock phosphate by composting bioprocess and bioaugmentation with consortia of PSM and PGRM.

As shown in FIG. 1, a preferred method and process 10 to produce BOP fertilizer through rock phosphate solubilization in accordance with a preferred embodiment can generally include isolation and selection of microorganisms 100 (including PSM at a minimum, or preferably the combination of PSM and PGRM), biocomposting and bioaugmentation with PSM and PGRM 200, and finally the production of BOP fertilizer 300.

Figure 2:
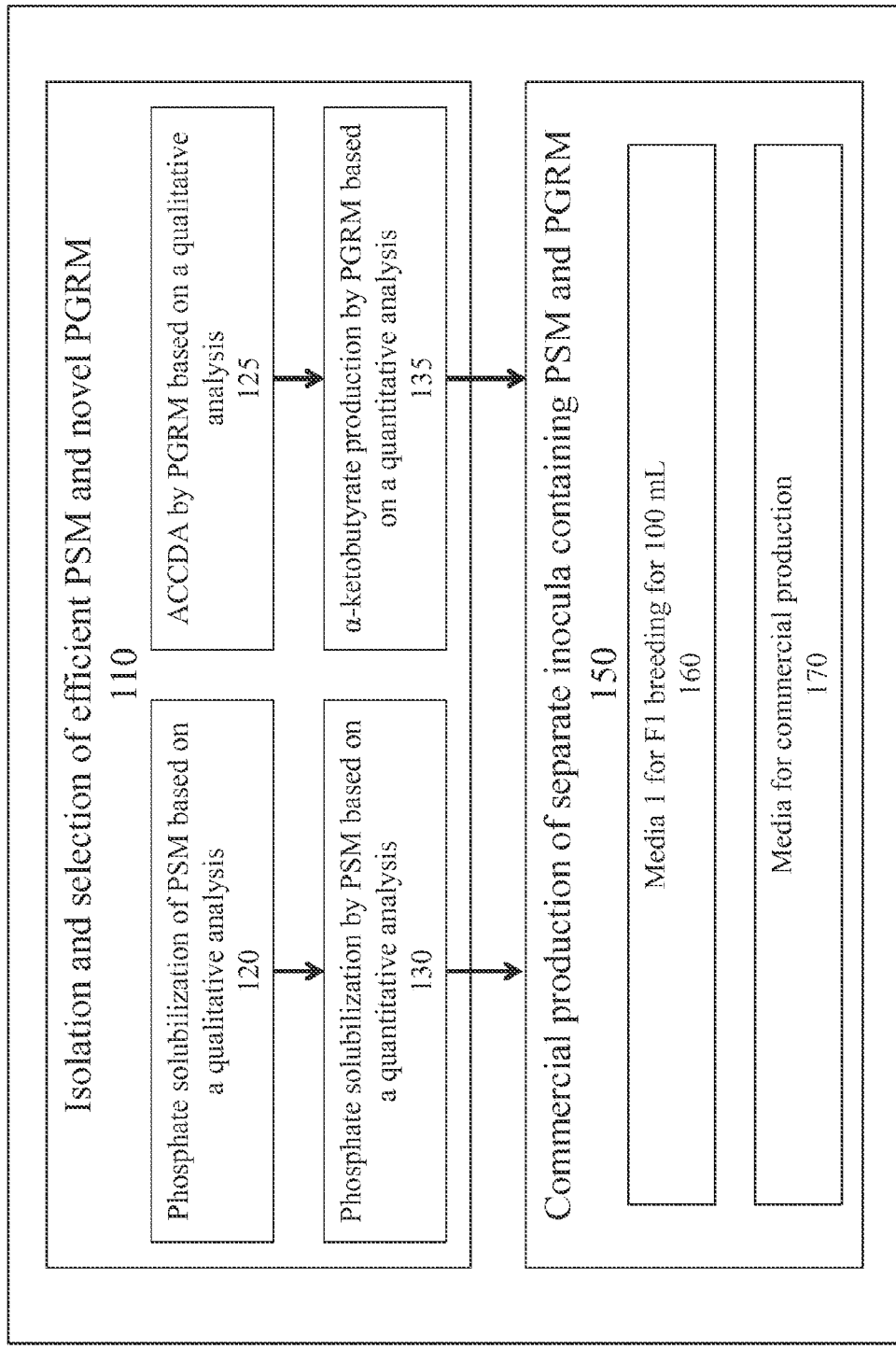
FIG. 2 depicts an overall flowchart illustrating an exemplary embodiment of a process by which isolation and selection of efficient PSM and novel PGRM is accomplished.

As shown in FIG. 2, the isolation and selection of microorganisms 100 may be accomplished through two intermediary steps: (1) isolation and selection of efficient PSM and novel PGRM 110; and (2) commercial production of separate inocula containing PSM and PGRM 150.

As to the first intermediary step (isolation and selection of efficient PSM and novel PGRM 110), rhizosphere soil is collected from crop fields. Crop plants are uprooted at different growth stages and brought to the laboratory in pre-sterilized polythene bags. Non-rhizosphere soil is removed by agitating the roots strongly. Soil strictly adhering to the roots is removed and used for isolation. Rhizomicrobes are then isolated by employing a serial dilution plate technique (as exemplified in Zuberer, 1994; see also Semedo et al., 2001; Shahzad et al., 2010) using rock phosphate enriched media (PEM) for PSM and ACC enriched media (ACCEM) for PGRM, separately. Colonies exhibiting prolific growth are selected for further streaking on fresh plates of respective medium. Further purification and multiplication of microbial isolates are performed by streaking fresh plates using PEM and ACCEM medium, respectively. The isolated PSM are then examined for P-solubilizing potentials and PGRM for ACC deaminase activity (ACCDA). Forty (40) mL of the sterilized respective broth containing RP and ACC are added to two autoclaved test tubes separately. The media are then inoculated with the PSM and PGRM, respectively, of uniform cell density and incubated between 25° C. to 35° C. An un-inoculated tube is used as a control. The PSM showing maximum phosphate solubilizing and PGRM showing maximum ACCDA are selected for further studies. Culturing conditions for maximized growth of PSM and P-solubilizing activity, and PGRM and ACCDA are thereafter optimized (as described infra). The optimal conditions for PSM and PGRM growth generally are between 25° C. to 38° C. at a pH close to neutral, with an incubation period of fifty to ninety six hours under shaking conditions.

As further shown in FIG. 2, in the preferred method and process, the phosphate solubilizing capability of PSM are observed based on a qualitative analysis 120 and quantitative analysis 130. In addition, ACCDA of the PGRM isolates are observed based on a qualitative analysis 125 as well as α-ketobutyrate production for quantitative analysis 135.

Optimizing the potential of PSM to solubilize rock phosphate based on a qualitative analysis 120 is performed by using the following preferred method and process: An agar medium is prepared wherein rock phosphate is the sole phosphorus source. PSM are tested by using halo zone formation. PSM are first cultured in broth for three to five days. Thereafter, a full loop containing culture is placed on each plate while incubating at 25° C. to 38° C. for six to ten days. Toothpicks are used for sampling. The formation of halo zones after fifty to ninety six hours of incubation indicates the PSM's ability to solubilize inorganic phosphorus. The experiment is performed three times to ensure consistent replication.

Optimizing the potential of PSM to solubilize inorganic phosphorous on the basis of quantitative analysis 130 is performed by using the following preferred method and process: A mathematical analysis of the solubilizing activity of PSM is determined by the methods described by Nautiyal (1999). Rock phosphate is used as insoluble inorganic form of phosphate in a broth medium. Quantitative estimations are based on measured performance of phosphate solubilization in broth culture inoculated with selected PSM in triplicate. An autoclaved un-inoculated medium should also be run as a control. Flasks of bacterial strains are incubated for two to four days at 25° C. to 38° C. in an orbital shaking incubator. Cultures are thereafter harvested by centrifugation at 8,000 to 10,000 rpm. A phosphate containing culture supernatant is estimated using the protocol described by Ryan et al. (2001).

Optimizing the potential of PGRM to generate ACCDA based on a qualitative analysis 125 is performed by using the following preferred method and process: DF minimal medium is prepared as per protocol described by Dworkin and Foster (1958) supplemented with ACC as the sole source of nitrogen. (Penrose and Glick 2003.) Solid DF minimal medium containing ACC is inoculated with a loop of starter culture (grown overnight in LB broth at 24° C. to 30° C. in an orbital shaking incubator). Plates are incubated at 24° C. to 30° C. in darkness. When a colony emerges within two to four days, that event indicates the existence of ACCDA.

Optimizing the potential of PGRM to generate ACCDA based on a quantitative analysis 135 is performed by suing the following preferred method and process: Quantitative determination of ACCDA of PGRM is done by measuring production of α-ketobutyrate from ACC. PGRM should be tested for ACCDA are incubated for twenty to thirty hours in DF minimal medium containing ACC in orbital shaking incubator. Then centrifuge the culture at 8,000 to 10,000 thousand rpm and the microbial pellet is obtained. The production of α-ketobutyrate is measured by using the reagent 2,4-dintrophenylehydrazine by following the protocol described by Penrose and Glick (2003).

Referring back to FIG. 2, the second step is the commercial production of separate inocula containing PSM and PGRM 150, which is accomplished by separately growing PSM and PGRM in two different steps using the same growth medium in two different containers. First, F1 breeding 100 mL of medium 1, 160 occurs. Thereafter the same inocula of PSM and PGRM are prepared separately using media in two different containers for commercial production 170. In other words, the basic breeding media is cultivated, then in a second step commercial media is used for large scale biomass production of PSM and PGRM, separately—(see tables in FIGS. 3 and 4). Finally the media for commercial production 170, one for PSM and the other for PGRM, should contain several billion bacteria colonies per milliliter in order to keep the respective inoculum viable for culturing, storage and field application.

As shown in FIG. 3, the F1 breeding for 100 mL of medium 1, 160 is prepared in two different containers for PSM and PGRM, separately, using mannitol, $KH_2PO_4$, yeast extract, and $MgSO_4$ maintaining pH levels of 6.0 to 7.5. The entire mixture is then autoclaved. Thereafter, the selected strains of PSM and PGRM are mixed, in their respective containers, when temperature drops. The flasks are incubated between 25° C. and 35° C. by continuous shaking on an orbital shaker. The desired population of PSM and PGRM is achieved within fifty to ninety six hours that can be checked periodically by using a UV-visible spectrophotometer.

As shown in FIG. 4, the media for commercial production 170 is prepared in two different containers for PSM and PGRM, separately, using $H_2O$, trypton, calcium pantothinate, yeast extract, vitamin B1, $KH_2PO_4$, and vitamin B12 while maintaining pH levels of 6.0 to 7.5. The pH should be adjusted to the target range by either by adding a few drops of $H_2SO_4$ or NaOH. The entire mixture is then autoclaved. Thereafter, the selected strains of PSM and PGRM are mixed in their respective containers when temperature drops. The flasks are incubated between 25° C. and 35° C. under shaking conditions by using continuous aeration. The desired population is achieved within fifty to ninety six hours that can be checked time to time by using UV-visible spectrophotometer.

Referring back to FIG. 1, the second major method and process is bicomposting and bioaugmentation with PSM and PGRM. Organic waste material is collected and sorted out to remove unwanted substances. The stored organic material is air dried to bring the moisture level below 30%. Dried organic matter along with rock phosphate is transferred into a composting unit. Readily available C-source (at 2% to 4%) is added during the composting to accelerate the bioprocess in a composter with an adjustable $min^{-1}$. Bioaugmentation with PSM and PGRM, separately, is then performed at later stages when the temperature falls to a level required to support mesophilic growth.

Figure 5:
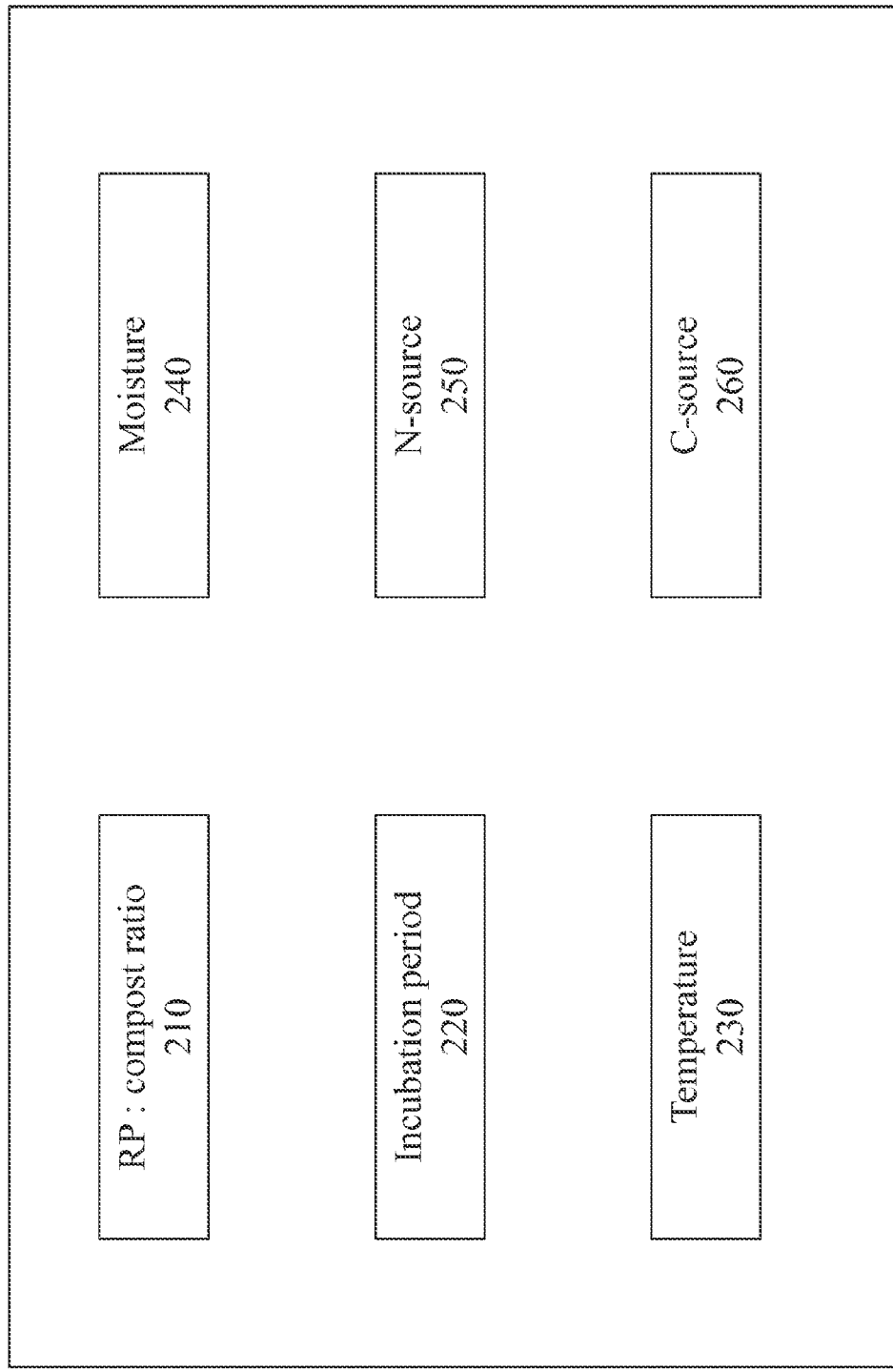
FIG. 5 depicts a chart of the factors that are preferably controlled during the composting process.

Referring to FIG. 5, there are six factors that must be optimized during the composting bioprocess 200 in light of variables such as soil types, organic matter, and climate considerations. Namely: (1) rock-phosphate to compost ratio (RP:compost ratio) 210; (2) incubation period 220; (3) temperature 230; (4) moisture 240; (5) N-source 250; and (6) C-source 260. Each is discussed, in turn:

Rock phosphate to compost ratio 210: In order to optimize the RP:compost ratio, different ratios should be used and analyzed during composting to test for maximum release of phosphorus from rock phosphate enriched compost (RP-EC) upon spiking in soil. It has been generally observed that ratios between 45:100 (RP:EC) and 60:100 (RP:EC) release the most phosphorus when spiked in soil.

Incubation period 220: Incubation time for optimum solubility of RP in RP-EC is determined by using different samples collected at different incubation times during the composting process. The release of P should be measured by spiking in soil with RP-EC. It has been generally observed that maximum phosphorus is released between nine to fourteen days of incubation.

Temperature 230: Simultaneously while controlling the incubation period 220, the suitable RP-compost mixture should also be evaluated at different temperature levels. Data should be collected weekly from RP-EC spiked soil to test for efficient release of phosphorus. It has been generally observed that maximum phosphorus is released when temperatures are controlled between 30° C. and 40° C.

Moisture 240: The suitable RP-compost mixture should likewise be evaluated at different moisture levels. Data should be collected weekly from RP-EC spiked soil to test for efficient release of phosphorus. It has generally been observed that maximum phosphorus is released when moisture is controlled between 10%, and 15%.

N-source 250: Trypton is a preferred N-source. For determining the best concentration of N-source to accelerate multiplication of microflora for accelerated solubilization of RP-P, different N levels should be tested. Data should be collected weekly from RP-EC spiked soil for efficient release of phosphorus. It has generally been observed that maximum phosphorus is released when N-source concentrations are controlled between 1% and 2% when spiked in soil.

C-source 260: High grade saccharose is a preferred carbon source. C-source concentration for optimum solubility of RP in RP-EC during composting bioprocess should be determined by adding different levels of C-source upon onset of composting. The release of phosphorus should be measured in soil spiked with RP-EC. It is commonly observed that maximum phosphorus is released when C-source concentration is controlled between 2% to 4%.

In the alternative, for formulation with manures, RP at desired concentration is blended and mixed with organic matter in the composting unit while controlling the RP:compost ratio, incubation period, temperature, moisture, N-source, and C-source. During this process, organic acids are released from decomposing organic matter that help solubilization of RP. The decomposition of organic material is determined by measuring C:P ratio. The resultant product would be rich in phosphorus as indicated by C:P ratio and mineralization potential in spiked soil.

Referring back to FIG. 1, the final major method and process is the production of bio-organo-phosphate (BOP) fertilizer 300. During the composting process of RP-EC, inocula of PSM and PGRM are added at different stages at the population level of several billion upon the onset of mesophilic phase (≤25° C. to 35° C.) for better survival and multiplication. A finished product in the form of BOP fertilizer occurs in two to four days of incubation.

A series of laboratory incubation trials should be conducted before and after spiking soil with BOP fertilizer to determine plant-available phosphorus content in native soil, ACCDA, and phosphorus content ($P_2O_5$) of formulated BOP fertilizer. Temperature should be controlled between 18° C. and 25° C. when conducting trials. As a benchmark, the effectiveness of the BOP fertilizer should be compared with commercial phosphatic fertilizer by using a variety of crops and vegetables, and using a multiplicity of field trials.

The preceding described embodiments of the invention are provided as illustrations and descriptions. They are not intended to limit the invention to precise form described. In particular, it is contemplated that functional implementation of invention described herein may be implemented equivalently in functional components, ingredients, processes or building blocks. Other variations and embodiments are possible in light of above teachings, and it is thus intended that the scope of invention not be limited by this Detailed Description, but rather by Claims following.

REFERENCES

Other Publications

The following documents are hereby incorporated by reference in their entirety:

Ahmad, R., S. M. Shahzad, A. Khalid, M. Arshad and M. H. Mahmood. 2007a. Growth and yield response of wheat (*Triticumaestivunt* L.) and Maize (*Zea mays* L.) to nitrogen and L. Tryptophan enriched compost. Pak. J. Bot 39: 541-549.

Ahmad R., G. Jilani, M. Arshad, Z. A. Zahir and A. Khalid. 2007b. Bio-conversion of organic waste for their recycling in agriculture and overview of perspective and prospects. Annals of Microbiology, 57(4): 471-479.

Ahmad A. K., G. Jilani, M. S. Akhtar, S. M. S. Naqvi and M. Rasheed. 2009. Phosphorus Solubilizing Bacteria Occurrence, Mechanisms and their Role in Crop Production. J. Agric. Biol. Cci. 1 (1): 48-58.

Alam, S. M, S. M. Shah and M. M. Iqbal. 2005. Evaluation of method and time of fertilizer application for yield and optimum P-efficiency in wheat. Songklanakarin J. Sci. Technol. 27: 457-463.

Aziz, T., Rahmatullah, M. A. Maqsood, M. A. Tahir, I. Ahmad and M. A. Cheema. 2006. Phosphorus utilization by six brassica cultivars (*Brassica juncea* L.) from tri-calcium phosphate; a relatively insoluble P compound. Pakistan journal of botany 38(5): 1529-1538.

Bhattacharyya, P., K. Chakrabarti, A. Chakraborty, D. C. Nayak, S. Tripathy and M. A. Powell. 2007. Municipal waste compost as an alternative to cattle manure for supplying potassium to lowland rice. Chemosphere. 66: 1789-1793.

Bojinova, D., R. Velkova and R. Ivanova. 2008. Solubilization of Morocophosphorite by *Aspergillusniger*. J. Bioresource TechnoL 99: 7348-7353.

Bucio, J. L., A. C. Ramirez and L. H. Estrella. 2003. The role of nutrient availability in regulating root architecture. Current Opinion in Plant Biology, 6: 280-287.

Caravaca, F., M. M. Alguacil, R. Azcon, G. Diaz and A. Roldan. 2004. Comparing the effectiveness of mycorrhizal inoculum and amendment with sugar beet, rock phosphate and *Aspergillusniger* to enhance field performance of the leguminous shrub *Dorycniumpentaphyllum* L. Appl. Soil Ecol., 25: 169-180.

Dastager, S. G., C. K. Deepa and A. Pandey. 2010. Isolation and characterization of novel plant growth promoting micrococcus sp NII-0909 and its interaction with cowpea. Plant Physiol. Biochem., 48(12): 987-992.

Dworkin M. and J. Foster. 1958. Experiments with some microorganisms which utilize ethane and hydrogen. J Bacteril 7 5: 592-601.

Gupta, A. and S. Sen. 2012. Role of biofertlizers and biopesticides for sustainable agriculture. Department of Biotechnology, Singhania University, Rajasthan.

Gyaneshwar, P., G. N. Kumar and L J. Parkh. 1998. Effect of buffering on the phosphate solubilizing ability of microorganisms. World J. Microbial. Biotechnol. 14: 669-673.

Hamza, M. A. and W. K. Anderson. 2010. Potential and limitations of soil organic matter build-up in dry areas. African Journal of Agricultural Research Vol. 5(20), pp. 2850-2861, 18 Oct. 2010.

Harris, J. N., P. B. New and P. M. Martin. 2006. Laboratory tests can predict beneficial effects of phosphate-solubilizing bacteria on plants. J. Soil Biol. & Bioch. 38: 1521-1526.

Khan, M. S. and A. Zaidi. 2007. Synergistic effects of the inoculation with plant growth promoting rhizobacteria and arbuscularmycrrhizal fungus on the performance of wheat Turkish J. Agric forest 31: 355-362.

Kennedy, A. C. and K. L. Smith, 1995. Soil microbial diversity and the sustainability of agriculture soils. Plant Soil. 170: 75-86.

Mahdi S. S., G. I. Hassan, S. A. Samoon, H. A. Rather, S. A. Dar and B. Zehra. 2010. Bio fertilizers in organic agriculture. Journal of Phytology, 2(10): 42-54.

Mullins, G. 2009. Phosphorus, agriculture and the environment. Virginia Polytechnic Institute and State University. Publication 424-029.

Nautiyal, C. S. 1999. An efficient microbiological growth medium for screening phosphate solubilizing microorganisms. FEMS MicrobioL Lett. 170: 265-270.

Penrose D. M. and B. R. Glick. 2003. Methods for isolating and characterizing ACC deaminase-containing plant growth-promoting rhizobacteria. Physiol Plant 118: 10-15.

Rizwan A., M. Arshad, A. Khalid and Z. A. Zaheer. 2008. Effectiveness of organic/bio-fertilizer supplemented with chemical fertilizers for improving soil\water retention, aggregate stability, growth and nutrient uptake of maize (*Zea mays* L.). Journal of Sustainable Agriculture, 31:4, 57-77.

Rodriguez, H. and R. Fraga. 1999. Phosphate solubilizing bacteria and their role in plant growth promotion. J. Biotech. Adv. 17: 319-339.

Ryan, J., G. Estefan and A. Rashid. 2001. Soil and Plant Analysis: Laboratory Manual. ICARDA, Aleppo.

Sachachtman, D. P., R. J. Rield and S. M. Ayling. 1998. Phosphorus uptake by plants from soil to cell. Plant physiology 116: 447-453.

Sekhar, D. M. R. and N. C. Aery. 2001. Phosphate rock with farmyard manure as P fertilizer in neutral and weakly alkaline soils. CURRENT SCIENCE. 80; 9-10.

Semedo, L T. A. S., A. A. Linhares, R. C. Gomes, G. P. Manfio, C. S. Alviano, L. F. Linares and R. R. R. Coelho. 2001. Isolation and characterization of actinomycetes from Brazilian tropical soils. Microbiol. Res. 155: 291-299.

Shahroona B., M. Naveed, M. Arshad and Z. A. Zahir. 2008. Fertilizer-dependent efficiency of Pseudomonads for improving growth, yield and nutrient use efficiency of wheat (*Triticum aestivum* L.). Appl Microbiol. Biotechnol 79: 147-155.

Shahzad, S. M., A. Khalid, M. Arshad and K. Rehman. 2010. Screening rhizobacteria containing ACC-deaminase for growth promotion of chickpea seedlings under axenic conditions. Soil & Environ. 29(1): 38-46.

Shenoy, V., V. G. M. Kalagudi. 2005. Enhancing plant phosphorus use efficiency for sustainable cropping. J. Biotechnol. Adv. 23: 501-513.

Straaten, P. V. 2002. Rocks for Crops: Agrominerals of sub-Saharan Africa. ICRAF, Nairobi, Kenya, 338 pp.

Takahashi, S. and M. Anwar. 2007. Wheat grain yield, phosphorus uptake and soil phosphorus fraction after 23 years of annual fertilizer application to an Andosol. J. Field Crops Res. 101: 160-171.

United Nations Environment Program (UNEP). 1996. Mineral Fertilizer Production and the Environment. Technical Report part 1.

Vance, C. P. 2001. Symbiotic nitrogen fixation and phosphorus acquisition: plant nutrition in a world of declining renewable resources. J. Plant Physiol. 127: 390-397.

Vance, C. P., C. Uhde-Stone and D. L. Allan. 2003. Phosphorus Acquisition and use: Critical adaptations by plants for securing a nonrenewable resources. New Phytol. 157: 423-447.

Vassilev, N and M Vassileva. 2003. Biotechnological solubilization of rock phosphate on media containing agro-industrial wastes. Appl Microbiol Biotechnol. 61: 435-440.

Walpola, B. C. and M. H. Yoon. 2012. Prospectus of phosphate solubilizing microorganisms and phosphorus availability in agricultural soils. African Journal of Microbiology Research Vol. 6(37), pp. 6600-6605.

Williamson, L. C., S. P. C. P. Ribrioux, A. H. Fitter and H. M. O. Leyser. 2001. Phosphate Availability Regulates Root System Architecture in *Arabidopsis*. J. Plant Physiol. 126: 875-882.

World Bank Group Report 2007. Environmental, health, and safety guidelines for Phosphate Fertilizer Manufacturing.

Zou, X., D. Binkley and K. Doxtader. 1992. A new method fix estimating gross phosphorus mineralization and immobilization rates in soils. J. Plant Soil. 52: 147-152.

Zuberer, D. 1994. Recovery and Enumeration of Viable Bacteria. 8: 119-144.

What is claimed is:

1. A bio-organo-phosphate (BOP) fertilizer comprising:
   a consortia of microorganisms including phosphorus solubilizing microorganisms (PSM) and plant growth regulating microorganisms (PGRM); and
   a rock phosphorous enriched compost;
   wherein:
   the PSM have an optimal growth temperature between 25° C. and 38° C., and
   the PSM and PGRM are different microorganisms.

2. The BOP fertilizer of claim 1 wherein the PSM is isolated from crop field rhizosphere soil.

3. The BOP fertilizer of claim 1, wherein at least one of the PSM and PGRM is isolated from crop field rhizosphere soil.

4. The BOP fertilizer of claim 1, wherein the PSM is selected from the group consisting of colonies of PSM exhibiting prolific growth in a phosphate enriched medium.

5. The BOP fertilizer of claim 1, wherein the PSM is selected from the group consisting of colonies of PSM showing maximum phosphate solubilizing potential in a phosphate enriched medium.

6. The BOP fertilizer of claim 5, wherein the sole source of phosphorus is rock phosphate.

7. The BOP fertilizer of claim 1, wherein the PGRM is selected from the group consisting of colonies of PGRM exhibiting prolific growth in a 1-amino-cyclopropane-carboxylic acid enriched medium.

8. The BOP fertilizer of claim 1, wherein the PGRM is selected from the group consisting of colonies of PGRM showing maximum 1-amino-yclopropane-carboxylic acid deaminase activity in a 1-amino-cyclopropane-carboxylic acid enriched medium.

9. The BOP fertilizer of claim 8 wherein, the sole source of nitrogen is 1-amino-cyclopropane-carboxylic acid.

10. The BOP fertilizer of claim 1 wherein:
    the consortia of PSM and PGRM are produced in two separate media;
    each medium is an F1 medium to breed one of the PSM and PGRM; and
    an F1 inocula of each F1 medium is used to produce the PSM and PGRM.

* * * * *